United States Patent [19]

Matsubara

[11] Patent Number: 4,992,813
[45] Date of Patent: Feb. 12, 1991

[54] LIGHT-SHIELDING BLADE
[75] Inventor: Takashi Matsubara, Tokyo, Japan
[73] Assignee: Niko Corporation, Tokyo, Japan
[21] Appl. No.: 512,428
[22] Filed: Apr. 23, 1990
[30] Foreign Application Priority Data
  Apr. 27, 1989 [JP] Japan .................................. 1-108068
[51] Int. Cl.⁵ .............................................. G03B 9/10
[52] U.S. Cl. ..................................................... 354/250
[58] Field of Search ................................. 354/241–265
[56] References Cited
  U.S. PATENT DOCUMENTS
  4,394,082 7/1983 Senuma et al. ..................... 354/246
  4,482,231 11/1984 Kato et al. ........................... 354/246
  4,775,583 10/1988 Kawamura ..................... 354/241 X
  FOREIGN PATENT DOCUMENTS
  0141625 9/1982 Japan .................................. 354/245
  59-61827 10/1982 Japan .

Primary Examiner—L. T. Hix
Assistant Examiner—Jae N. Noh
Attorney, Agent, or Firm—Shapiro and Shapiro

[57] ABSTRACT

A light-shielding blade made of a carbon fiber-reinforced plastic plate, composed of three or more reinforced plastic sheets each of which consists of continuous carbon fibers aligned in one direction and matrix resin enveloping the carbon fibers and which are plane symmetrically laminated in such a manner that the directions of fibers of the sheets are mutual substantially perpendicular. The carbon fiber-reinforced plastic plate has a thickness in a range of 60 to 120 μm, and carbon black is incorporated only in the outermost ones of the sheets constituting the plate, a black coating of a thickness of 0.1 to 3 μm is provided on each surface of the plate.

4 Claims, 1 Drawing Sheet

LIGHT-SHIELDING BLADE
BACKGROUND OF THE INVENTION

1. Field of the Invention

The present invention relates to a light-shielding blade required to effect high-speed movement, such as a shutter blade for use in a focal plane shutter or a lens shutter of a camera, or a diaphragm blade.

2. Related Background Art

Such light-shielding blade is preferably capable of high speed movement with a small driving force and with a sufficiently high bending rigidity, and, for this reason, there is required a light-shielding blade of light weight, high strength and high rigidity. For use in such light-shielding blade, there is already known, as disclosed in the Japanese Laid-open Pat. Sho No. 59-61827 of the present applicant, a plate material composed of plural reinforced plastic sheets which are reinforced with continuous carbon fibers aligned in one direction and which are laminated plane symmetrically in the direction of thickness in such a manner that the directions of said fibers are perpendicular or substantially perpendicular between the neighboring sheets. A light-shielding blade can be obtained by cutting said plate material in a desired shape. However such light-shielding blade has been associated with scattered portions lacking light-shielding ability, such as pinholes, because of the thickness as small as 60 to 120$\mu$.

For this reason, it has been customary to provide both surfaces of the light-shielding blade with black coatings of a thickness of 5 to 10$\mu$. Said black coating can be obtained by applying black paint usually called dry lube, and hardening said paint by drying. In addition to the ensuring of light-shielding property, said black coating also serves for antireflection, improvement of lubrication and appearance.

However, the light-shielding blade having such black coatings has been associated with drawbacks of (1) a high defect rate due to bending of the blade after coating, (2) a high defect rate in terms of precision of thickness, because of significant unevenness in the thickness, and (3) insufficient stability in high-speed motion.

SUMMARY OF THE INVENTION

In consideration of the foregoing, the object of the present invention is to provide a light-shielding blade providing a high production yield and ensuring excellent stability in high-speed motion.

As the result of intensive investigation the present inventor has identified that the thickness of said black coating as large as 5 to 10$\mu$ induces (1) a large contraction at the hardening, eventually leading to the bending of the blade, (2) unevenness in the coating, eventually leading to the fluctuation in thickness of the blade, and (3) an unwanted weight balance due to said fluctuation in thickness of the blade, deteriorating the stability in high-speed motion.

Further investigation has lead to a finding that these drawbacks can be resolved by reducing the thickness of coating to 0.1–3$\mu$.

However such reduced coating thickness gives rise to new drawbacks of reduced light shielding ability and reduced antireflective ability.

The present inventor has found a way to solve these new drawbacks by incorporating carbon black in the surfacial sheets, and have thus reached the present invention.

Therefore, the present invention is to provide a light-shielding blade essentially composed of a carbon fiber-reinforced plastic plate material of a thickness of 60 to 120$\mu$ made of at least three reinforced plastic sheets each of which is composed of continuous carbon fibers aligned in a direction and matrix resin enclosing said fibers and which are laminated plane symmetrically in such a manner that the directions of said fibers are perpendicular or substantially perpendicular in adjacent sheets, wherein carbon black is incorporated only in the sheets constituting both surfaces of said plate material and black coatings are provided on both surfaces with a thickness of 0.1 to 3$\mu$, preferably 0.5 to 2$\mu$.

Said plate material can generally be produced by laminating plural prepreg sheets constituting precursor materials in such a manner that the directions of fibers are perpendicular or substantially perpendicular, and hardening the entire laminate by heating under pressure. Said prepreg sheet is preduced by arranging continuous carbon fibers in a direction in a thin plate form, then impregnating said fibers with thermosettable resin liquid, such as unhardened liquid of epoxy resin or unsaturated polyester, constituting precursor of the matrix resin, and turning said resin liquid into the B-stage, in which the resin is in a partially solidified state without apparent fluidity and can be completely cured by heating.

For obtaining the plate material to be employed in the present invention, there have to be prepared two prepreg sheets constituting the surfacial layers, and at least a prepreg sheet for the intermediate layer or layers.

The prepreg sheet for use as a surfacial layer is prepared either by dispersing carbon black into the resin liquid constituting the precursor of the matrix resin, or by pressing resin liquid, containing carbon black at a high concentration, into an ordinary prepreg sheet for example with a roll coater. The carbon black preferably has an average particle size not exceeding 0.07 $\mu$m, and is added preferably in an amount of 5 to 15 parts by weight with respect to 100 parts by weight of the solid content of the resin liquid.

After the prepreg sheets constituting the carbon black-containing surfacial layers and the carbon black-free intermediate layer or layers are prepared, at least three prepreg sheets of said two kinds are laminated plane symmetrically in the direction of thickness in such a manner that the directions of carbon fibers of the surfacial layer and the intermediate layer are mutually perpendicular or substantially perpendicular, and are heated under pressure to obtain the plate material, in which the resin is cured by crosslinking.

The carbon black is incorporated preferably in an amount of 5 to 15 parts by weight with respect to 100 parts by weight of the solid of the resin liquid, since an amount less than 5 parts by weight is unable to achieve sufficient light shielding and antireflection, while an amount exceeding 15 parts by weight deteriorates the arrangement of fibers thereby undesirably affecting the flatness of the plate, and also deteriorates the fluidity of the resin liquid, thereby producing internal pores or causing peeling between the layers.

The resin content in the prepreg sheet is advantageously 10 to 30 wt. %, preferably 38 to 40 wt. %. A lower resin content leads to the following drawbacks when the carbon black is incorporated.

A low resin content disturbs the arrangement of the carbon fibers, thus deteriorating the distribution of internal stress of the surfacial layer. As the result, the flatness is deteriorated to extremely lower the yield of acceptable products. Also on the external surface there appear pores and small cracks, thus undesirably affecting the coating property. Furthermore irregularities are developed on the surface, thus deteriorating the abrasion resistance, lubricating performance and appearance. Also if the resin content is low, there may appear streaks at the resin flow, thus deteriorating the appearance.

The thickness of the plate material is selected within a range of 60 to 120$\mu$, in consideration of the application for light-shielding blade. Consequently a prepreg sheet has a thickness of 10-60$\mu$, or contains 10-60 g/cm$^2$ of carbon fibers. The prepreg sheets need not be of a same thickness, but can be of different thicknesses or of different carbon fiber contents, as long as they are plane symmetrically with respect to the central plane. As long as the thickness of the plate material can be maintained within the specified value, the thickness or the carbon fiber content of the intermediate layer or layers is preferably made larger than that of the surfacial layers (one layer on each surface) in order to increase the bending rigidity of the entire plate material.

The plate material thus obtained is cut into the desired shape of light-shielding blade (usually by press punching), and black "dry lube" coating is applied on both surfaces and on cut faces. The dry lube coating itself is already known, but, as one of the features of the present invention, it is applied with a thickness (after curing by drying) of 0.1 to 3$\mu$, preferably 0.5 to 2$\mu$.

In the present invention, carbon black is not incorporated in the intermediate layers, because of the following reasons:

(1) Since carbon black is relatively poorly dispersible in the matrix resin, a strict control on the thickness raises the production cost of the prepreg sheet. Also the prepreg sheet containing carbon black is used only in special purposes and is therefore expensive;

(2) The prepreg sheet of predetermined thickness is difficult to produce, but a prepreg sheet of a thickness outside the specified range cannot be used because the lamination of such prepreg sheet in three or more layers will further enhance the error in thickness. However, the carbon black-containing prepreg sheet of a thickness outside of the specified range can be used if a more easily manufacturable natural sheet (free from carbon black) of a suitable thickness is selected and used for the intermediate layers;

(3) Incorporation of carbon black into the intermediate layers is meaningless in terms of antireflective effect;

(4) Incorporation of carbon black into the intermediate layers reduces the tenacity of the light-shielding blade;

(5) Also incorporation of carbon black into the intermediate layers deteriorates the fatigue resistance.

In the following the present invention will be clarified in greater detail by embodiments thereof, but the present invention is not limited to such embodiments.

DESCRIPTION OF THE PREFERRED EMBODIMENTS (1) A prepreg sheet A, with a carbon fiber content of 20 g/m$^2$ and a resin content of about 43 wt. % was prepared by impregnating carbon fibers aligned in a direction with epoxy resin liquid, in which carbon black of average particle size of 0.02$\mu$ was added in an amount of 10 parts by weight with respect to 100 parts by weight of the solid content of said resin and sufficiently mixed, and changing said resin into B-stage.

(2) A prepreg sheet B of the same carbon fiber content, with a resin content of about 40 wt. %, was prepared in the same manner as in (1), however without the addition of carbon black.

Figure 1:
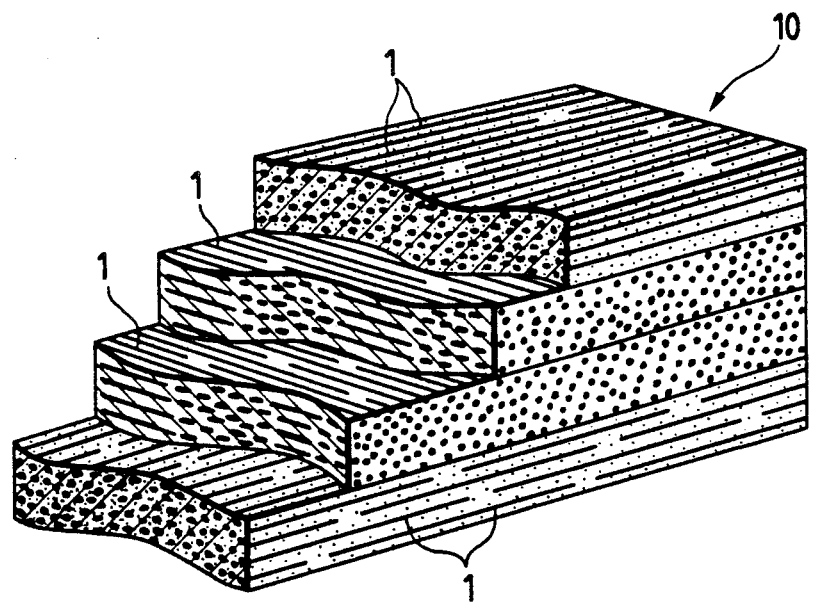
FIG. 1 is a partially cut-off perspective view of an embodiment of the light-shielding blade.
Figure 2:
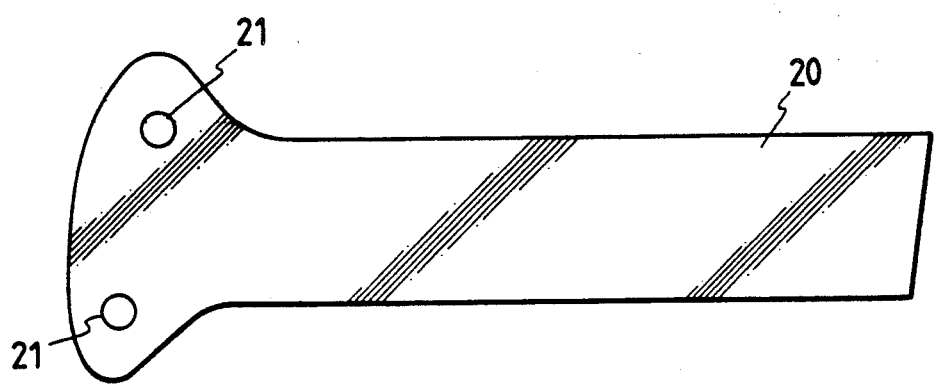
FIG. 2 is a plan view of a light-shielding blade in a state in the course of preparation.

(3) Two prepreg sheets A and two prepreg sheets B were plane symmetrically laminated in an order of A/B/B/A and with fiber directions of 0°/90°/90°/0°. The obtained laminate was cured for 1-2 hours at a temperature of 130° C. and under a pressure of 5-15 kg/cm$^2$, and was then gradually cooled to obtain a plate material 10 of a thickness of 90-100$\mu$, as shown in FIG. 1. In FIG. 1, numeral 1 indicate carbon fibers;

(4) Said plate material 10 was punched, by press punching, into a shape as shown in FIG. 2, and dry lube coating was applied with a thickness of 1$\mu$ on both surfaces to obtain a light-shielding blade 20. Numerals 21 indicate caulking holes;

(5) The light-shielding blade 20 thus obtained showed durability in excess of 400,000 times in the high-speed shutter durability test, thus proving sufficient high-speed movability and stability at high-speed motion.

The intermediate layer may be composed of one or three or more prepreg sheets B of same or different carbon fiber contents, or composed of two prepreg sheets as explained above. In case the intermediate layer is composed of two or more prepreg sheets, the directions of carbon fibers thereof have to determined so as to attain plane symmetry.

According to the present invention, as explained in the foregoing, the use of black coating of a thickness reduced to 0.1-3$\mu$ reduces the defect rate resulting from the bending of plate after coating, also reduces the unevenness in the thickness of the plate, and improves the stability in high-speed motion. Also sufficient light shielding property and antireflective property are ensured, as the deterioration in these properties resulting from the reduce thickness of black coating is prevented by the incorporation of carbon black in the surfacial layers.

In the conventional technology, the coating becomes excessively thick around the caulking holes due to the edge effect, thereby causing fluctuation in the caulking strength or affecting the high-speed movability due to the fluctuation in weight. According to the present invention, the use of a thinner coating avoids these drawbacks and reduces the defect rate. Since these drawbacks appear in the final stage of manufacturing process, solution to these drawbacks contributes significantly to the cost reduction in mass production.

What is claimed is:
1. A light-shielding blade comprising:
a carbon fiber-reinforced plastic plate material which is composed of three or more reinforced plastic sheets each consisting of continuous carbon fibers arranged in a direction and matrix resin enveloping said carbon fibers, said sheets being laminated plane symmetrically in such a manner that the di- rections of fibers in said sheets are mutually perpendicular or substantially perpendicular, and which has a thickness of 60 to 120 μm;

wherein carbon black is incorporated only in the outermost ones of said sheets constituting said carbon fiber-reinforced plastic plate, and said plate is provided with a black coating of a thickness of 0.1 to 3 μm on the surfaces.

2. A light-shielding blade according to claim 1, wherein said black coating has a thickness of 0.5 to 2 μm.

3. A shutter blade comprising:

a carbon fiber-reinforced plastic plate material which is composed of three or more reinforced plastic sheets each consisting of continuous carbon fibers arranged in a direction and matrix resin enveloping said carbon fibers, said sheets being laminated plane symmetrically in such a manner that the directions of fibers in said sheets are mutually perpendicular or substantially perpendicular, and which has a thickness of 60 to 120 μm;

wherein carbon black is incorporated only in the outermost ones of said sheets constituting said carbon fiber-reinforced plastic plate, and said plate is provided with a black coating of a thickness of 0.1 to 3 μm on the surfaces.

4. A shutter blade according to claim 3, wherein said black coating has a thickness of 0.5 to 2 μm.

* * * * *